US012223789B2

(12) United States Patent
Uchimura et al.

(10) Patent No.: US 12,223,789 B2
(45) Date of Patent: Feb. 11, 2025

(54) STORE MANAGEMENT APPARATUS, STORE MANAGEMENT METHOD, AND NON-TRANSITORY COMPUTER-READABLE STORAGE MEDIUM

(71) Applicant: NEC Corporation, Tokyo (JP)

(72) Inventors: Jun Uchimura, Tokyo (JP); Yuji Tahara, Tokyo (JP); Rina Tomita, Tokyo (JP); Yasuyo Kazo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 18/019,326

(22) PCT Filed: Aug. 10, 2021

(86) PCT No.: PCT/JP2021/029521
§ 371 (c)(1),
(2) Date: Feb. 2, 2023

(87) PCT Pub. No.: WO2022/034881
PCT Pub. Date: Feb. 17, 2022

(65) Prior Publication Data
US 2023/0282049 A1 Sep. 7, 2023

(30) Foreign Application Priority Data
Aug. 12, 2020 (JP) .................. 2020-136368

(51) Int. Cl.
G07C 9/27 (2020.01)
G06K 7/10 (2006.01)
(Continued)

(52) U.S. Cl.
CPC .............. G07C 9/27 (2020.01); G07C 9/25 (2020.01); G06K 7/10415 (2013.01); G06K 19/06037 (2013.01); G07C 9/29 (2020.01)

(58) Field of Classification Search
CPC ... G07C 9/27; G07C 9/25; G07C 9/29; G06K 7/10415; G06K 19/06037; G06Q 50/10
(Continued)

(56) References Cited
U.S. PATENT DOCUMENTS 7,127,706 B2 * 10/2006 Mason ...................... G06F 8/60
717/121
9,035,971 B2 * 5/2015 Aoki ....................... G09G 5/00
715/767
(Continued)

FOREIGN PATENT DOCUMENTS

| JP | H06-020182 A | 1/1994 |
| JP | 2007-107222 A | 4/2007 |
| JP | 2019-121011 A | 7/2019 |

OTHER PUBLICATIONS

International Search Report for PCT Application No. PCT/JP2021/029521, mailed on Oct. 19, 2021.

Primary Examiner — Nam V Nguyen
(74) Attorney, Agent, or Firm — Sughrue Mion, PLLC

(57) ABSTRACT

A store management apparatus (100) includes: a determination unit (102) that determines whether a predetermined reference is satisfied in a store; a mode switching unit (104) that switches, by using a determination result by the determination unit (102), an operation mode of the store between an attended mode in which at least a salesclerk is permanently stationed and an unattended mode in which the salesclerk is not permanently stationed; and a setting unit (106) that switches a store-entry condition to the store according to the operation mode after switching when the mode switching unit (104) switches the operation mode, wherein the predetermined reference is absence of a customer near an entrance of the store at a reference time.

17 Claims, 9 Drawing Sheets

(51) Int. Cl.
  *G06K 19/06*  (2006.01)
  *G07C 9/25*   (2020.01)
  *G07C 9/29*   (2020.01)

(58) Field of Classification Search
  USPC .......................................................... 340/5.7
  See application file for complete search history.

(56) References Cited

U.S. PATENT DOCUMENTS

| | | | |
|---|---|---|---|
| 9,275,382 B2* | 3/2016 | Dubois | G07G 1/12 |
| 11,023,740 B2* | 6/2021 | Mirza | G06V 20/41 |
| 11,605,057 B2* | 3/2023 | Hara | G06Q 20/20 |
| 11,628,574 B2* | 4/2023 | Pathross | B25J 13/06 |
| | | | 700/228 |
| 11,705,244 B1* | 7/2023 | Berme | G16H 40/63 |
| | | | 702/19 |
| 11,749,044 B2* | 9/2023 | Masuda | G07C 9/257 |
| | | | 700/275 |
| 11,763,567 B2* | 9/2023 | Kakino | E05F 3/222 |
| | | | 382/103 |
| 2010/0217433 A1 | 8/2010 | Son | |
| 2021/0019770 A1* | 1/2021 | Yamasaki | G06V 40/50 |
| 2021/0090057 A1* | 3/2021 | Takeno | G08B 13/19608 |
| 2022/0366423 A1* | 11/2022 | Kogure | G06Q 20/401 |
| 2023/0094972 A1* | 3/2023 | Saito | G06Q 30/06 |
| | | | 382/118 |

* cited by examiner

FIG. 6A

| APPARATUS/FACILITY | ATTENDED MODE | UNATTENDED MODE |
|---|---|---|
| OPENING/CLOSING OF AUTOMATIC DOOR AT ENTRANCE (STORE-ENTRY CONDITION) | IN CONJUNCTION WITH HUMAN DETECTION SENSOR | READING OF MEMBERSHIP CARD/BIOMETRIC AUTHENTICATION |
| OPENING/CLOSING OF AUTOMATIC DOOR AT ENTRANCE (STORE-EXIT CONDITION) | IN CONJUNCTION WITH HUMAN DETECTION SENSOR | CONFIRM STORE-ENTRY RECORD EXIT PERMITTED WITH RECORD |
| CASH REGISTER PRODUCT MASTER | NO LIMITATION | CANNOT SELL ALCOHOLIC BEVERAGES AND THE LIKE |
| CASH REGISTER | SPECIFY SALESCLERK/ CUSTOMER OPERATION | SELF-CHECKOUT |
| ATTENDED CASH REGISTER | USABLE | UNUSABLE POWER OFF |
| SURVEILLANCE CAMERA | SET SURVEILLANCE LEVEL TO NORMAL | INCREASE SURVEILLANCE LEVEL |

FIG. 6B

| APPARATUS/FACILITY | ATTENDED MODE | UNATTENDED MODE |
|---|---|---|
| NORMAL CASH REGISTER | USABLE | UNUSABLE POWER OFF/PROTECTION SHEET |
| FRYER | USABLE | UNUSABLE POWER OFF |
| ALCOHOLIC BEVERAGE DISPLAY SHELF | AVAILABLE FOR SALE OPEN | UNAVAILABLE FOR SALE SHIELDED BY SHUTTER AND THE LIKE |

STORE MANAGEMENT APPARATUS, STORE MANAGEMENT METHOD, AND NON-TRANSITORY COMPUTER-READABLE STORAGE MEDIUM

This application is a National Stage Entry of PCT/JP2021/029521 filed on Aug. 10, 2021, which claims priority from Japanese Patent Application No. 2020-136368, filed on Aug. 12, 2020, the contents of all of which are incorporated herein by reference, in their entirety.

TECHNICAL FIELD

The present invention relates to a store system, a store management apparatus, a store management method, and a program.

BACKGROUND ART

In these days, a labor shortage in a store such as a retail store has been confronting a serious situation, and labor saving has been becoming a challenge. In such a background, unattended business of a store has been advancing. An example of an unattended store system is described in Patent Document 1. In the unattended store system, a user who visits an unattended store passes through a gate and enters a sales area divided by a sales apparatus that sells a product to a user, purchases a product by the sales apparatus, then passes through the gate, and exits the sales area. A product sold by the sales apparatus is stored in an automatic warehouse being adjacent to the sales area. The sales area and the automatic warehouse are separated by a partition wall in such a way that a user who visits the unattended store cannot enter the automatic warehouse.

RELATED DOCUMENTS

Patent Documents

[Patent Document 1] Japanese Patent Application Publication No. 2019-121011

SUMMARY OF INVENTION

Technical Problem

The unattended store system described in the patent document described above has a purpose of taking a measure in terms of crime prevention in an unattended store and increasing efficiency of automatic sales. Meanwhile, for example, there is a store in an operation form in such a way as to conduct attended business in a normal situation, and conduct unattended business in only a specific time period such as midnight. In such a store, a procedure of switching an operation mode is complicated, and a load on a salesclerk is great.

The present invention has been made in view of the circumstance described above, and an object thereof is to reduce a load on a salesclerk at a time of switching between different operation modes in a store.

Solution to Problem

In each aspect according to the present invention, each configuration below is adopted in order to solve the above-mentioned problem.

A first aspect relates to a store management apparatus.

The store management apparatus according to the first aspect includes:
  a determination unit that determines whether a predetermined reference is satisfied in a store;
  a mode switching unit that switches, by using a determination result by the determination unit, an operation mode of the store between an attended mode in which at least a salesclerk is permanently stationed and an unattended mode in which the salesclerk is not permanently stationed; and
  a setting unit that switches a store-entry condition to the store according to the operation mode after switching when the mode switching unit switches the operation mode, wherein
  the predetermined reference is absence of a customer near an entrance of the store at a reference time.

A second aspect relates to a store management method executed by at least one computer.

The store management method according to the second aspect includes, by a store management apparatus:
  determining whether a predetermined reference is satisfied in a store;
  switching, by using a determination result, an operation mode of the store between an attended mode in which at least a salesclerk is permanently stationed and an unattended mode in which the salesclerk is not permanently stationed; and
  switching a store-entry condition to the store according to the operation mode after switching when the operation mode is switched, wherein
  the predetermined reference is absence of a customer near an entrance of the store at a reference time.

Note that, another aspect according to the present invention may be a program causing at least one computer to execute the method in the second aspect described above, or may be a computer-readable storage medium that stores such a program. The storage medium includes a non-transitory tangible medium.

The computer program includes a computer program code causing a computer to execute the store management method on the store management apparatus when the computer program code is executed by the computer.

Note that, any combination of the components above and expression of the present invention being converted among a method, an apparatus, a system, a storage medium, a computer program, and the like are also effective as a manner of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap each other, and the like.

Further, a plurality of procedures are described in an order in the method and the computer program according to the present invention, but the described order does not limit an order in which the plurality of procedures are executed. Thus, when the method and the computer program according to the present invention are executed, an order of the plurality of procedures can be changed within an extent that there is no harm.

Furthermore, a plurality of procedures of the method and the computer program according to the present invention are not limited to being executed at individually different timings. Thus, another procedure may occur during execution of a certain procedure, an execution timing of a certain procedure and an execution timing of another procedure may partially or entirely overlap each other, and the like.

Advantageous Effects of Invention

According to each of the aspects described above, a load on a salesclerk at a time of switching between different operation modes in a store can be reduced.

BRIEF DESCRIPTION OF THE DRAWINGS

FIG. 6 is a diagram FIGS. 6A and 6B are diagrams each illustrating a setting content of each apparatus by mode.

EXAMPLE EMBODIMENT

Hereinafter, example embodiments of the present invention will be described with reference to the drawings. Note that, in all of the drawings, a similar component has a similar reference sign, and description thereof will be not appropriately included.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or an inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

First Example Embodiment

<System Outline>

Figure 1:
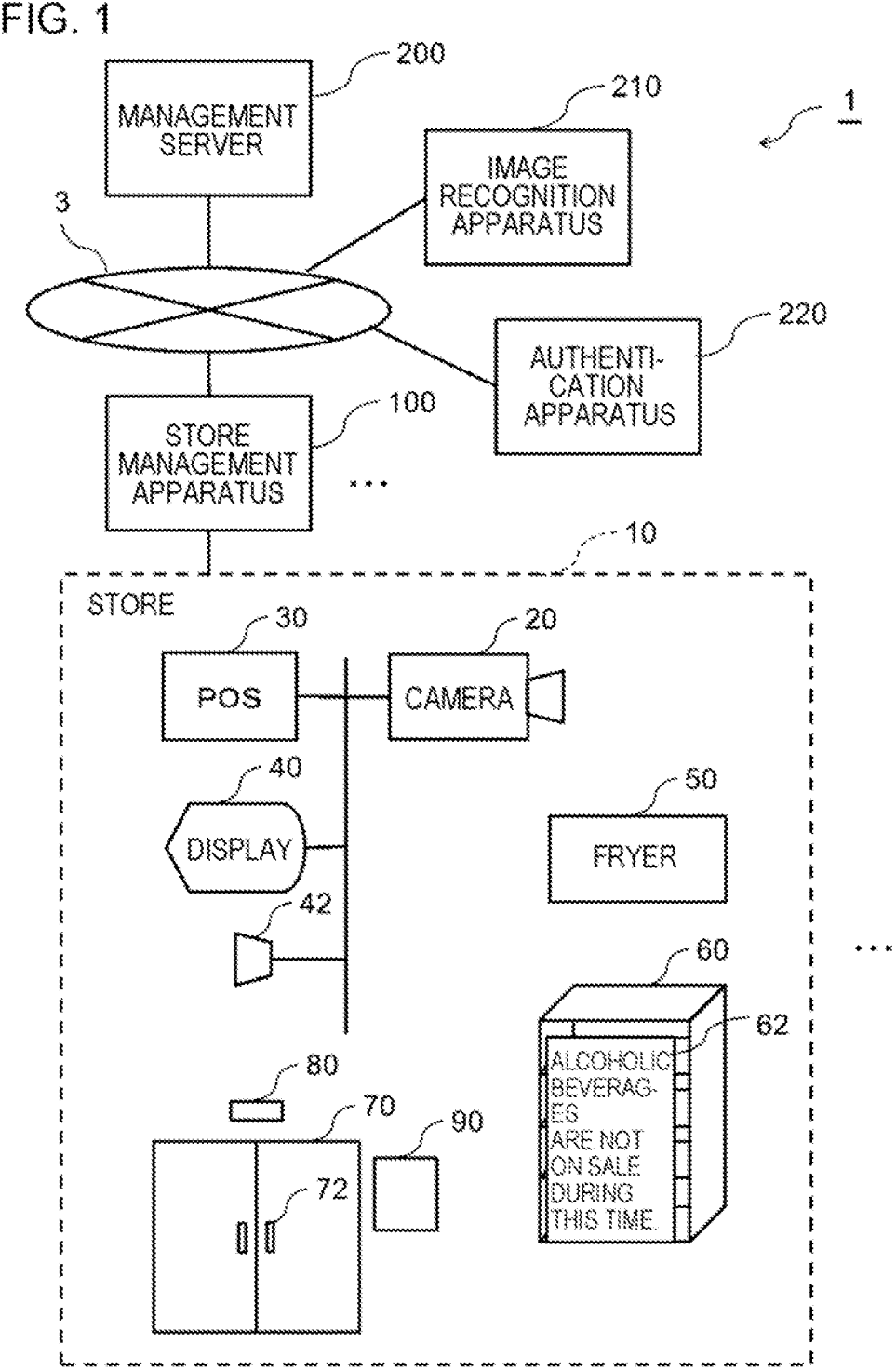
FIG. 1 is a diagram for describing an outline of a store system according to an example embodiment of the present invention.

FIG. 1 is a diagram for describing an outline of a store system 1 according to an example embodiment of the present invention. The store system 1 includes a store management apparatus 100 that manages a store 10, and a management server 200 that manages the store management apparatus 100 of at least one store 10. The management server 200 is connected to the store management apparatus 100 of at least one store 10 via a communication network 3. Further, the store system 1 may include an image recognition apparatus 210 that performs image authentication processing on a captured image of a camera 20 installed in the store 10, and an authentication apparatus 220 that performs authentication processing on a store user who has performed user registration in advance.

A user (also referred to as a customer) of the store 10 according to the present example embodiment performs membership registration of use of the store 10 in advance. When the membership registration is performed, a membership card in which membership information including membership identification information is recorded is issued. On the membership card, a two-dimensional code in which the membership information is recorded may be printed, or the membership card may be a magnetic stripe card, an integrated circuit (IC) card, and the like in which the membership information is recorded.

Further, by logging in to a Web site for membership on a browser or installing and logging in to a special application by using a user terminal (not illustrated) of a customer, a two-dimensional code (for example, a quick response (QR) code (registered trademark)) including membership information can be displayed on a screen of the user terminal and used instead of a membership card.

The membership card is provided to a salesclerk for receiving a service limited to members such as provision and use of a point in the store 10, use of a privilege, and a discount, for example. Furthermore, as described below, settlement processing can be performed by causing a point of sales (POS) terminal 30 to read membership information at a time of registration and settlement processing of a purchase product. Furthermore, during an unattended mode, opening and closing of an automatic door 70 can be performed by causing an entry/exit management terminal 90 to read the membership information of the membership card at a time of an entry/exit to or from the store 10.

In the present example embodiment, a configuration for managing the store 10 by using one store management apparatus 100 for one store 10, and collectively managing the store management apparatuses 100 of a plurality of the stores 10 by the management server 200 will be described as an example.

The store 10 is, for example, a retail store such as a convenience store, a supermarket, a drugstore, and a stall. The store 10 may be a store that sells various services, not limited to sales of a product, such as a video rental store that rents various media being a book, a magazine, music (including sound), or a moving video, or a laundry.

The store 10 has at least two different operation modes of an attended mode in which at least a salesclerk is permanently stationed and an unattended mode in which a salesclerk is not permanently stationed, and, for example, switches the operation mode by a time period. However, in the unattended mode, a salesclerk may be present in the store 10. The unattended mode may include, for example, a labor-saving business mode handled by a small number of salesclerks, and a one-man operation mode handled by only one salesclerk. During the unattended mode, for example, it is assumed that a customer performs registration of a product and settlement processing by himself/herself with the point of sales (POS) terminal 30. The operation mode may include three or more modes.

In the store 10, at least one of a so-called self-checkout terminal on which a customer performs product registration processing and settlement processing by himself/herself, and the POS terminal 30 that can switch between a mode operated by a salesclerk and a mode operated by a customer. A mode of the POS terminal 30 may be set according to information indicating an operation mode of a store. However, the store 10 may further include the POS terminal 30 that can be operated by only a salesclerk.

The POS terminal 30 includes, for example, a touch panel-type display, a scanner that reads a bar code, and a printer that prints out a receipt and the like.

A customer can perform the product registration processing and the settlement processing by operating the POS terminal 30. For example, a customer displays, on his/her user terminal, a two-dimensional bar code indicating membership identification information on which membership registration has been performed in advance. By reading the two-dimensional bar code by the scanner to cause the POS terminal 30 to acquire the membership identification information and to determine the customer, and then by further reading a product bar code of a product to be purchased by the scanner, the registration processing of a purchase product is performed.

For example, the settlement processing may be able to be performed by a payment method specified in advance by a customer determined by the POS terminal 30 by membership identification information. For example, a payment by a card, a payment by electronic money, and the like may be able to be specified. In a case of a payment by a card, a customer can register a card number in advance. Further, for the settlement processing, an operation screen that requires a customer to input identification confirmation information (for example, a password, a PIN code, a date of birth, and the like) for personal authentication may be displayed on a display of the POS terminal 30 as necessary, and the identification confirmation information may be input by an operation on a touch panel of the POS terminal 30.

At least one camera 20 is installed in the store 10. The camera 20 may be a so-called surveillance camera. The camera 20 includes a lens and a capturing element such as a charge coupled device (CCD) image sensor, and is, for example, a network camera such as an Internet protocol (IP) camera. The network camera has, for example, a local area network (LAN) communication function, and is connected to the store management apparatus 100 via a relay apparatus (not illustrated) such as a router of a communication network. The camera 20 may be a camera that is installed on a ceiling of the store 10 for a purpose of preventing crime and can perform capturing in all directions by 360 degrees. As one example, the camera 20 is a camera equipped with a fisheye lens. The camera 20 may include a mechanism for performing control of an orientation of a camera main body and a lens, zooming control, focusing control, and the like by following a movement of a person in a store.

An image generated by the camera 20 may be a moving image being captured in real time, may be a frame image by each predetermined interval, or may be a still image. An image transmitted to the store management apparatus 100 may be directly transmitted from the camera 20 to the store management apparatus 100, may not be directly transmitted from the camera 20, or may be an image delayed by a predetermined time. An image captured by the camera 20 may be once stored in another storage apparatus (not illustrated), and may be read by the store management apparatus 100 from the storage apparatus successively or by each predetermined interval.

A display 40 such as signage may be provided in the store 10. For example, an image such as a content for an advertisement, and a content including notification information such as a precaution and a notice to a customer is displayed on the display 40. An image is at least either a still image or a moving image. Furthermore, a speaker 42 that outputs a sound may be provided in the store 10. A sound of a video displayed on the display 40, background music (BGM), an in-store announcement, and the like can be output.

A fryer 50 that cooks deep-fried food and the like may be installed in the store 10. Furthermore, a display shelf 60 (a gondola, a refrigerator, or the like) on which a product with a limited sellable time such as alcoholic beverages is displayed may be installed in the store 10 in a manner distinguished from a display shelf (not illustrated) of another product.

The automatic door 70 that can be automatically opened and closed is installed at an entrance of the store 10. The automatic door 70 is provided with a human detection sensor 80 on at least any one of a transom (attachment on a transom, attachment below a transom, attachment inside a transom, or the like) of the automatic door 70, a ceiling near the automatic door 70, and a high place. The human detection sensor 80 is preferably provided on both of the inside and the outside of the store 10. The human detection sensor 80 is, for example, a light source reflection method such as an infrared ray, a microwave method, or the like, and detects presence of a person. A kind, an installation position, and an installation number of the human detection sensor 80 are not limited. For example, the human detection sensor 80 may be an infrared sensor in a transmission method being provided at feet of a person who passes through the automatic door 70, or may be a sensor that detects a load movement of a person by a piezoelectric element installed on a floor surface of a passage passing through the automatic door 70. A plurality of the human detection sensors 80 may be combined.

The automatic door 70 is subjected to opening/closing control of the door in conjunction with the human detection sensor 80. When presence of a person is detected by the human detection sensor 80, the door is automatically opened, and the door is automatically closed after a lapse of a predetermined time after the person passes.

Furthermore, the automatic door 70 may be provided with a touch center 72, and the door can also be opened by a touch operation on the touch center 72. Then, after absence of a person near the entrance is detected, the door is automatically closed.

The entry/exit management terminal 90 is provided near the automatic door 70. The entry/exit management terminal 90 is provided outside the store 10 or provided on both of the inside and the outside of the store 10. The entry/exit management terminal 90 is an apparatus for authenticating a customer as a member of the store 10 when the customer enters or exits the store during the unattended mode, and managing the customer who enters and exits the store 10. However, a customer other than a member may also be able to enter and exit the store 10 by capturing a face by the camera 20. The authentication or the capturing being performed is one example of a store-entry condition during the unattended mode. Details will be described below. Further, in a case where the entry/exit management terminal 90 is installed only outside the store 10, a customer performs the authentication or the capturing when the customer enters the store during the unattended mode, and the customer may be able to freely exit without the authentication and the capturing at a time of a store exit.

Functional Configuration Example

Figure 2:
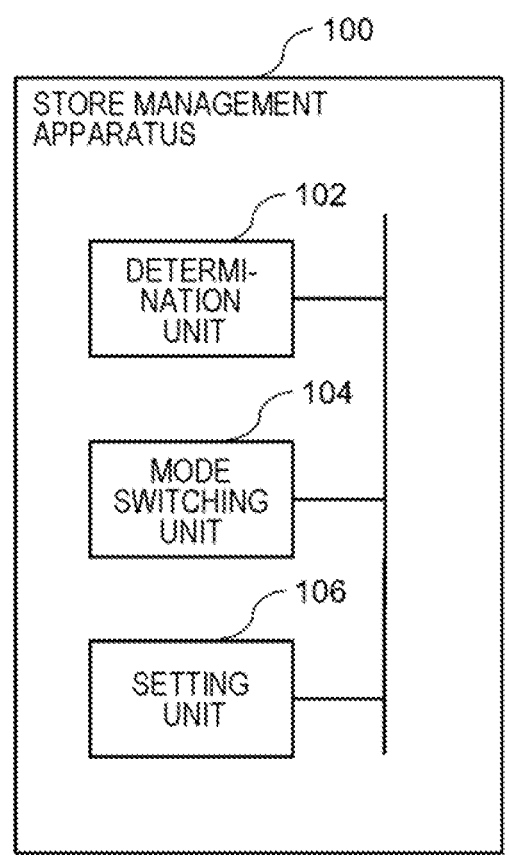
FIG. 2 is a functional block diagram illustrating a logical configuration example of a store management apparatus according to the example embodiment of the present invention.

FIG. 2 is a functional block diagram illustrating a logical configuration example of the store management apparatus 100 according to the example embodiment of the present invention. The store management apparatus 100 includes a determination unit 102, a mode switching unit 104, and a setting unit 106. The operation mode includes the attended mode in which at least a salesclerk is permanently stationed and the unattended mode in which a salesclerk is not permanently stationed.

The determination unit 102 determines whether a predetermined reference is satisfied in the store 10. The predetermined reference is a reference for a condition for whether switching of the operation mode of the store 10 can be achieved. In the present example embodiment, the reference for a condition for whether switching of the operation mode can be achieved is when a current time is a reference time and absence of a customer near the entrance of the store 10.

The reference time is a time at which the attended mode switches to the unattended mode, and is, for example, 10 pm or the like. Alternatively, the reference time is a time at which the unattended mode switches to the attended mode, and is, for example, 6 am or the like. Setting of the reference time may be able to be changed for each store or each season and each region. Details of a method for determining whether a customer is present or not near the entrance of the store 10 will be described below.

The mode switching unit 104 switches the operation mode of the store 10 between the attended mode and the unattended mode by using a determination result by the determination unit 102. The setting unit 106 switches a store-entry condition to the store 10 according to the operation mode after switching when the mode switching unit 104 switches the operation mode. The store-entry condition will be described below.

Hardware Configuration Example

Figure 3:
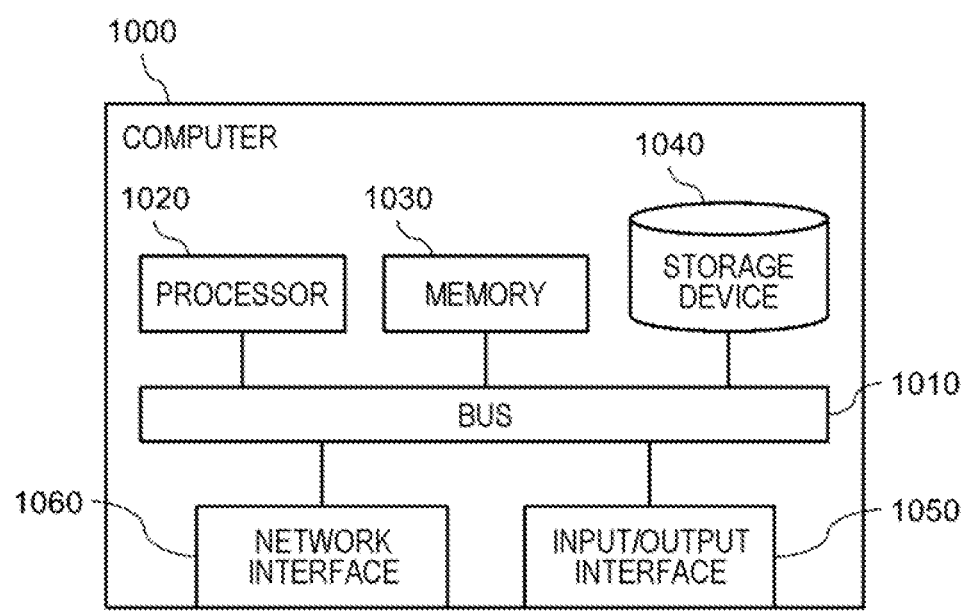
FIG. 3 is a block diagram illustrating a hardware configuration of a computer that achieves the store management apparatus illustrated in FIG. 2.

FIG. 3 is a block diagram illustrating a hardware configuration of a computer 1000 that achieves the store management apparatus 100 illustrated in FIG. 2. The computer 1000 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, the determination unit 102, the mode switching unit 104, and the setting unit 106, and a control unit 120, an output unit 122, a notification unit 124, and the like according to an example embodiment described below) of the store management apparatus 100. Furthermore, the storage device 1040 stores various types of settings (for example, information such as a predetermined reference, each apparatus of the store 10, a setting content of each facility, and a necessary condition for mode switching) used by the above-described functional components of the store management apparatus 100. The processor 1020 reads each program module onto the memory 1030 and executes the program module, and each function associated with the program module is achieved.

The program module may be stored in a storage medium. The storage medium that stores the program module may include a non-transitory tangible medium usable by the computer 1000, and a program code readable by the computer 1000 (the processor 1020) may be embedded in the medium.

The input/output interface 1050 is an interface for connecting the computer 1000 and various types of input/output equipment.

The network interface 1060 is an interface for connecting the computer 1000 to a communication network 3. The communication network 3 is, for example, a local area network (LAN) and a wide area network (WAN). A method of connection to the communication network 3 by the network interface 1060 may be wireless connection or wired connection.

Then, the computer 1000 is connected to necessary equipment (for example, a camera, a display, and a speaker) via the input/output interface 1050 or the network interface 1060.

The store management apparatus 100 described above is achieved by the computer 1000 such as a personal computer and a tablet terminal being provided in the store 10, for example. The management server 200 is achieved by the computer 1000 such as a server computer, a personal computer, and a tablet terminal being provided at a management center and a data center that manage the store 10, for example. For example, the store management apparatus 100 is achieved by installing an application program for achieving the store management apparatus 100 in the computer 1000 and activating the application program.

In another example, the computer 1000 may be a Web server, and a user may activate a browser by a user terminal such as a personal computer, a smartphone, and a tablet terminal and may access a Web page providing a store management service of the store management apparatus 100 via a network such as the Internet, and thus a function of the store management apparatus 100 may be able to be used.

In still another example, the computer 1000 may be a server apparatus of a system such as software as a service (SaaS) providing a store management service of the store management apparatus 100. A user may access a server apparatus from a user terminal such as a personal computer, a smartphone, and a tablet terminal via a network such as the Internet, and the store management apparatus 100 may be achieved by a program operating on the server apparatus.

Operation Example

Figure 4:
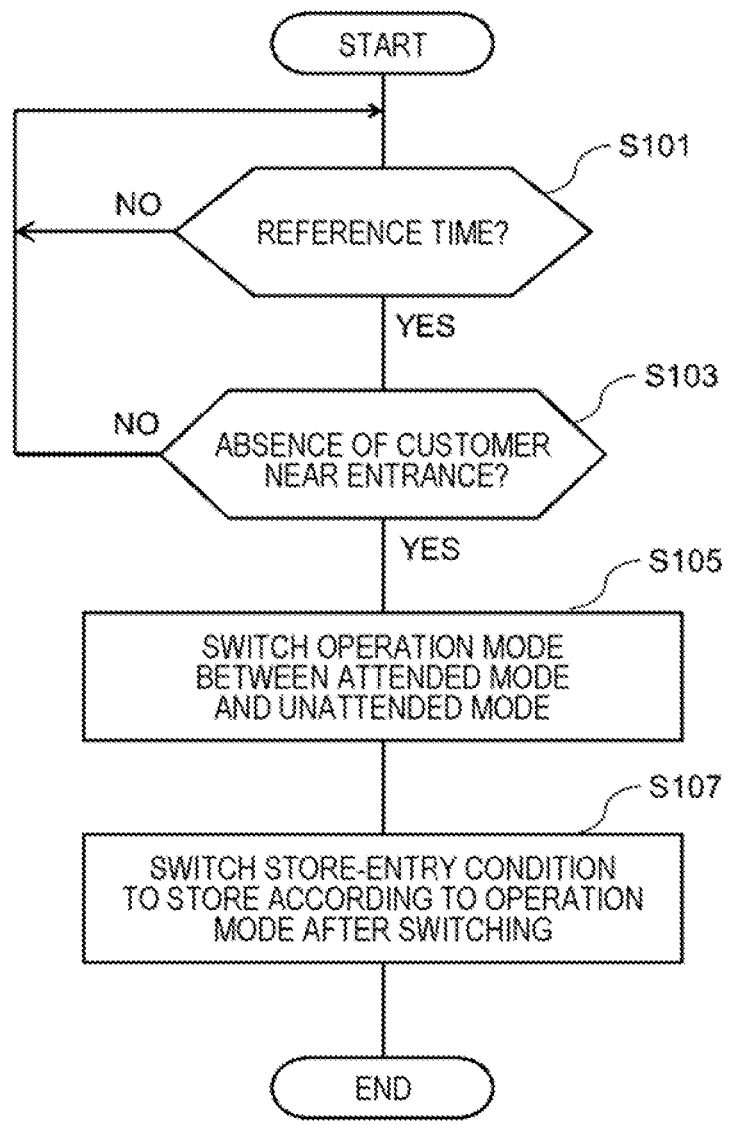
FIG. 4 is a flowchart illustrating one example of an operation of the store management apparatus according to the present example embodiment.

FIG. 4 is a flowchart illustrating one example of an operation of the store management apparatus 100 according to the present example embodiment.

First, the determination unit 102 surveys whether a current time is a reference time (step S101). The current time may be acquired from a clock (not illustrated) included in the computer 1000, or may be acquired from a network time protocol (NTP) server via the communication network 3.

The determination unit 102 waits until the current time is the reference time (NO in step S101).

For example, an operation of the store management apparatus 100 at 10 pm being the reference time at which the attended mode switches to the unattended mode will be described. When 10 pm being the reference time is detected (YES in step S101), the determination unit 102 confirms absence of a customer near the entrance of the store 10 (step S103).

A method for determining presence or absence of presence of a customer near the entrance of the store 10 is exemplified below, for example.

First, surroundings of the entrance of the store 10 are captured by the camera 20, and presence or absence of a person is determined by performing image recognition processing on the captured image by the image recognition apparatus 210. Next, when a person is detected, the person detected by the image recognition processing may be distinguished as a person other than a salesclerk. For example, a face of a salesclerk and information indicating a feature (for example, a height, a width, a pose, a gait, clothing (for example, a uniform of the salesclerk and the like), and the like) of a body portion other than the face are registered in advance, and whether a detected person is the salesclerk is determined by performing the image recognition processing on an image of the detected person. Alternatively, biometric authentication information about a salesclerk may be registered in advance, and a salesclerk and a customer being a store member may be detected by using a biometric authentication apparatus (not illustrated).

A reason for confirming presence or absence of presence of a customer near the entrance of the store 10 is described below. In the attended mode, opening/closing control of the door at the entrance is performed simply by the human detection sensor, and a customer can freely enter and exit. On the other hand, in the unattended mode, opening and closing of the door may be controlled in such a way as to permit an exit of only a person having a store-entry record by authentication or capturing at a time of a store entry by the entry/exit management terminal 90. In that case, a customer who enters the store without a special procedure (authentication and capturing) during the attended mode cannot exit during the unattended mode. Since the customer who enters the store without the authentication and the capturing during the attended mode thinks that the customer can also exit the store without the special procedure at a time of a store exit, the customer may think that the customer is locked in and may feel at a loss when the customer cannot suddenly exit the store. Furthermore, it is inconvenient for the customer to need the special procedure for the store exit.

Thus, for a customer remaining in the store until a time after the reference time by a predetermined time, for example, the customer can be notified about a switching time of the operation mode by an in-store announcement and the like before mode switching (for example, before 30 minutes, before 10 minutes, and the like; this time is appropriately set based on a size of a sales area, an average time of stay of the customer, and the like for each store 10), and a procedure and effort being required at a time of a store exit after the mode switching.

Furthermore, in a configuration in which presence or absence of presence of a customer near the entrance of the store 10 is not confirmed, for example, when two persons attempt to enter the store together, a first customer can enter the store without the authentication and the capturing due to the attended mode, but a second customer who attempts to enter the store of the two persons needs the authentication and the capturing due to the unattended mode, and may not be able to enter the store together with the first customer who enters the store.

Thus, in the present example embodiment, when at least one customer is present near the entrance at a point in time of the reference time, a fixed time interval is provided in such a way not to perform switching of the operation mode until the customer completely finishes exiting the store, completely finishes entering the store, or returns to the inside of the store from the vicinity of the entrance.

A range of the vicinity of the entrance where presence or absence of presence of a customer is confirmed may be able to be set according to an environment (a structure, a layout, and the like of a floor) of the store 10 by specifying, for each store 10, a capturing range of the camera 20 or a range surveyed in a captured image.

The determination unit 102 waits until absence of the customer near the entrance is determined (NO in step S103). When absence of the customer near the entrance is determined (YES in step S103), the mode switching unit 104 switches the operation mode between the attended mode and the unattended mode (step S105). In step S102, it is detected that 10 pm being the reference time at which the attended mode is switched to the unattended mode has passed, the mode switching unit 104 switches the operation mode from the attended mode to the unattended mode.

A procedure of switching of the operation mode is exemplified below, which is not limited thereto.

(1) A salesclerk (preferably a store manager or other responsible person, or an administrator) performs switching of the operation mode by visually confirming a situation of the store 10, then deciding whether the mode switching can be achieved, and operating an operation screen, an operation switch, or the like of the store management apparatus 100.

(2) The store management apparatus 100 collects various types of information indicating a situation of the store 10, the determination unit 102 decides whether the mode switching can be achieved, based on the situation of the store 10, and the mode switching unit 104 automatically performs switching of the operation mode of the store management apparatus 100, based on a determination result.

(3) The management server 200 at the management center acquires information about the store from the store management apparatus 100 and displays the information on a monitor, and an administrator at the management center views the monitor, confirms the situation of the store 10, then decides whether the mode switching can be achieved, performs an input of an instruction to switch the operation mode of the store management apparatus 100 by remote control, and transmits the mode switching instruction to the store management apparatus 100.

(4) The management server 200 at the management center acquires information about the store from the store management apparatus 100, decides whether the mode switching can be achieved, based on the situation of the store 10, and automatically performs switching of the operation mode of the store management apparatus 100 by remote control.

(1) to (4) may be combined. For example, after the automatic switching of (4) is attempted, for an item that cannot be automatically switched and an item that does not satisfy a reference, an administrator at a management center of (3) may confirm a situation, perform remote control, and further instruct the store 10 to confirm a situation as necessary.

However, as described below, the condition for deciding whether the mode switching can be achieved may include a plurality of items. Furthermore, there may be a plurality of decision references of each item. Which condition is determined by using which reference may be able to be appropriately or freely selected for each store 10, each season, and the like. Further, the determination unit 102 of the store management apparatus 100 or the management server 200 may perform a determination whether the mode switching can be achieved, based on at least some conditions of the plurality of conditions, and the other condition may be confirmed and decided by a salesclerk of the store 10 and an administrator at the management center, that is, manually.

Then, the setting unit 106 switches a store-entry condition to the store 10 according to the operation mode after switching when the mode switching unit 104 switches the operation mode (step S107). The store-entry condition is a condition for opening the automatic door 70 at the entrance of the store 10 and permitting a store entry of a customer.

The mode switching unit 104 sets, as the store-entry condition when the operation mode is the attended mode, detection of a person by the human detection sensor 80 in conjunction with opening/closing control of the automatic door 70 at the entrance of the store 10. On the other hand, the store-entry condition when the operation mode is the unattended mode is that reception of an input of a store-entry operation of a customer being performed on the entry/exit management terminal 90 installed near the automatic door 70 at the entrance of the store 10. Note that, the automatic door 70 may be configured to open the door in response to reception of an input of a store-entry operation, or may be configured in such a way that presence of a person is detected by the human detection sensor 80 when a customer stands in front of the automatic door 70 after reception of an input of a store-entry operation, and then the door of the automatic door 70 is opened.

However, the store-entry condition after reception of an input of a store-entry operation during the attended mode and the unattended mode may be presence or absence of detection of presence of a person, and thus presence of a person may be detected by a method other than the human detection sensor 80. For example, a configuration for detecting a person by using a captured image of the camera 20 is also not excluded. Furthermore, after reception of an input of a store-entry operation during the attended mode and the unattended mode, the automatic door 70 can also be opened by a touch operation by a customer on the touch center 72.

On the other hand, authentication based on membership information by the authentication apparatus 220 is needed as reception of an input of a store-entry operation of a customer being performed on the entry/exit management terminal 90, which is the store-entry condition, during the unattended mode. Specifically, a customer causes the entry/exit management terminal 90 to read membership information by an insertion operation (scanning, a touch, a non-contact operation, or the like) of a membership card or holding up a two-dimensional code including membership information displayed on a screen of a portable terminal of the customer. The entry/exit management terminal 90 transmits the read membership information to the authentication apparatus 220, and causes the authentication apparatus 220 to perform verification processing.

However, the authentication processing by the authentication apparatus 220 may be based on biometric authentication information other than the authentication processing based on membership information. The entry/exit management terminal 90 may include a capturing unit (not illustrated) or a biometric authentication information reading unit (not illustrated) that acquires biometric authentication information. Biometric authentication information about a customer and a salesclerk may be registered in advance, and the entry/exit management terminal 90 may acquire the biometric authentication information about the customer, transmit the biometric authentication information to the authentication apparatus 220, and cause the authentication apparatus 220 to perform biometric authentication processing. The biometric authentication information includes at least any one feature value such as a face, a fingerprint, a vein, an iris, an auricle, and a gait, for example. In this case, a press on an operation button for capturing a customer is an input of a store-entry operation of the customer being performed on the entry/exit management terminal 90.

Then, the entry/exit management terminal 90 receives an authentication result from the authentication apparatus 220. The entry/exit management terminal 90 includes a control unit (not illustrated) that performs the opening/closing control of the automatic door 70 in response to the authentication result. When authentication that a customer is a member succeeds, based on the authentication result received from the authentication apparatus 220, the control unit opens the automatic door 70 or instructs the automatic door 70 to be opened. When the authentication fails, the control unit does not open the automatic door 70 or does not instruct the automatic door 70 to be opened.

According to the present example embodiment, when business continues by switching different operation modes in the store 10, whether switching can be achieved is decided according to a predetermined condition for mode switching, and thus the switching of a mode is performed in a state suitable for a mode to which the store 10 shifts. Thus, the switching of a mode can be smoothly performed.

Further, since a state of the store 10 after the mode switching is also controlled in such a way as to be brought into a predetermined state, a procedure for the mode switching can be omitted, and a load of the switching between different operation modes on a salesclerk can be reduced. Furthermore, an occurrence of a mistake in the procedure during the mode switching can be reduced, and safety can also be improved.

Second Example Embodiment

Functional Configuration Example

Figure 5:
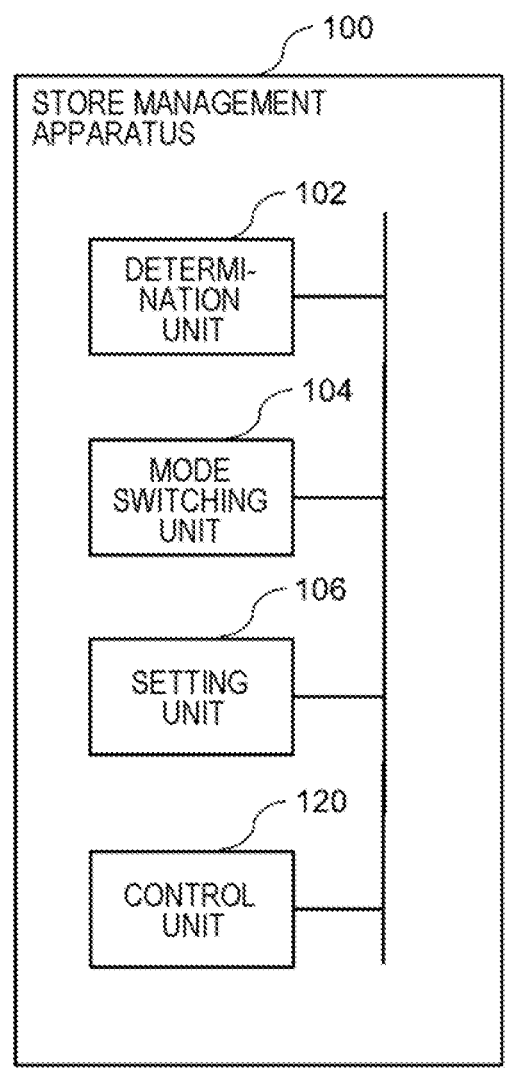
FIG. 5 is a functional block diagram illustrating a logical configuration example of the store management apparatus according to the present example embodiment.

FIG. 5 is a functional block diagram illustrating a logical configuration example of a store management apparatus 100 according to the present example embodiment. The store management apparatus 100 according to the present example embodiment is similar to that in the example embodiment described above except for a point that the store management apparatus 100 according to the present example embodiment has a configuration for controlling an apparatus in a store 10 according to an operation mode of the store 10. The store management apparatus 100 has a configuration similar to that of the store management apparatus 100 in FIG. 2, and also further includes the control unit 120.

The control unit 120 controls an apparatus in the store 10 according to an operation mode.

Setting and the like of various apparatuses and facilities in the store 10 are changed according to an operation mode. For an apparatus being automatically controlled among the apparatuses, the control unit 120 performs control on the apparatus in such a way that setting is to correspond to an operation mode after the change at a time of switching of a mode.

Hereinafter, a setting content of each apparatus or each facility by operation mode will be described.

FIGS. 6A and 6B are diagrams each illustrating a setting content of each apparatus by mode. FIG. 6A is setting being automatically changed, and FIG. 6B is setting in which a salesclerk and the like manually perform changing work.

An apparatus and a facility being a control target are, for example, an automatic door 70 at an entrance of the store 10, a POS terminal 30 (indicated as a "cash register" in FIGS. 6A and 6B), a fryer 50, a display shelf 60, and the like, which are not limited thereto.

Hereinafter, each apparatus and each facility will be described.

The automatic door 70 is subjected to opening/closing control in conjunction with a human detection sensor 80 during an attended mode, and is not particularly limited. During an unattended mode, the automatic door 70 stops the opening/closing control in conjunction with the human detection sensor 80 until an entry/exit management terminal 90 receives an input of a store-entry operation of a customer, and performs the opening/closing control of the door, based on an authentication result by an authentication apparatus 220 for a user whose input of the store-entry operation is received by the entry/exit management terminal 90. Alternatively, after authentication succeeds, the opening/closing control may be performed in conjunction with the human detection sensor 80.

The control unit 120 performs an instruction for a control unit (not illustrated) of the automatic door 70 to perform the opening/closing control in conjunction with the human detection sensor 80 at a time of shifting to the attended mode. Furthermore, the control unit 120 performs an instruction for the entry/exit management terminal 90 to stop an operation at the time of shifting to the attended mode. The control unit 120 performs an instruction for the control unit of the automatic door 70 to stop the opening/closing control in conjunction with the human detection sensor 80 at a time of shifting to the unattended mode. Furthermore, at the time of shifting to the unattended mode, the control unit 120 instructs the entry/exit management terminal 90 to start entry/exit management processing (authentication processing of a user), start the opening/closing control of the automatic door 70, based on an authentication result, or start the opening/closing control of the automatic door 70 in conjunction with the human detection sensor 80 with reception of an input of a store-entry operation of a customer as a condition.

Furthermore, in a case of the unattended mode, the control unit 120 may receive a press on a capturing button by a customer as an input of a store-entry operation of the customer, and may cause a camera to capture a face of the customer who enters the store 10.

Further, in a case of a store that approves an operation permitting a store entry of a user who does not perform membership registration during the unattended mode, a face of a user may be captured and recorded instead of acquisition of membership information. When the control unit 120 does not receive an input of a store-entry operation of a customer in a case of the unattended mode, the control unit 120 causes a camera of the entry/exit management terminal 90 to capture a face of the customer. The store-entry operation of a customer is an input of membership information or biometric authentication information to the entry/exit management terminal 90. However, a place captured by the camera of the entry/exit management terminal 90 may be a place other than a face of a customer, and may include a whole body and the biometric authentication information described above.

A setting unit 106 may set, according to an operation mode, an exit condition for opening the automatic door 70 at the entrance when a customer exits the store 10. For example, the exit condition is the same as the store-entry condition during the attended mode, and is detection of a person by the human detection sensor 80 in conjunction with the opening/closing control of the automatic door 70 at the entrance of the store 10.

During the unattended mode, similarly to the attended mode, the exit condition may be detection of a person by the human detection sensor 80 in conjunction with the opening/closing control of the automatic door 70 at the entrance of the store 10, or the exit condition may be presence of a store-entry record.

Furthermore, when the exit condition during the unattended mode is presence of a store-entry record, the automatic door 70 confirms a record at a time of a store entry from a person who exits, and controls an exit in response to presence or absence of the store-entry record, that is, controls opening and closing of the door, based on a determination whether to open the automatic door 70. Also, in this case, similarly to a time of a store entry, after authentication succeeds, the door of the automatic door 70 may be immediately opened, or, after the authentication succeeds, the door may be opened by the opening/closing control of the automatic door 70 in conjunction with the human detection sensor 80.

When the exit condition is presence of a store-entry record after shifting to the unattended mode, the control unit 120 instructs the entry/exit management terminal 90 to perform a determination whether an exit can be achieved by presence or absence of a store-entry record related to a user who attempts to exit.

During the attended mode, the POS terminal 30 enables both of an operation by a salesclerk and an operation by a customer, and enables setting by a salesclerk or setting by a system. The POS terminal 30 is used in a self-checkout mode operated by a customer himself/herself during the unattended mode.

The control unit 120 switches an operating mode of the POS terminal 30 at a time of switching from the attended mode to the unattended mode. Specifically, the control unit 120 instructs the POS terminal 30 in an operation mode by a salesclerk during the attended mode to switch to a self-checkout mode operated by a customer himself/herself at a time of shifting to the unattended mode. For switching between a salesclerk operation mode and a self-checkout mode at a time of shifting to the attended mode, either automatic switching by the control unit 120 or manual switching by a salesclerk may be able to be selected and set.

During the attended mode, the POS terminal 30 uses a normal product master including all products being an available target in the store 10. During the unattended mode, the POS terminal 30 may perform control in such a way not to sell a product prohibited from sale during the mode.

Among the POS terminals 30, an attended cash register can be used during the attended mode, but cannot be used during the unattended mode. Therefore, the control unit 120 instructs the attended cash register to switch to an unavailable state at a time of shifting to the unattended mode. The control unit 120 may instruct the attended cash register to switch to a normal operation state at a time of shifting to the attended mode. When the POS terminal 30 does not have a function of switching to the unavailable state, switching between OFF and ON of power of the POS terminal 30 may be performed.

A camera 20 that surveys the store 10 may be in a normal surveillance mode during the attended mode, and may be in a mode at a high surveillance level during the unattended mode. As an increase in a surveillance level, for example, an increase in resolution of a captured image, an increase in image quality, a change in number and position of the camera 20 to be operated, an increase or a reduction in surveillance place (a place unnecessary to be surveyed is not surveyed, and surveillance of a place particularly desired to be surveyed is strengthened), a start of image recognition processing by using the captured image (processing such as detection of a suspicious person or suspicious behavior by the image recognition processing and detection of an abnormality in a store), and the like are conceivable.

The control unit 120 instructs the camera 20 to perform capturing in the normal mode at a time of shifting to the attended mode. The control unit 120 instructs the camera 20 to change to setting of increasing the surveillance level described above at a time of shifting to the unattended mode.

Next, switching work at a time of mode shifting of each apparatus and each facility will be described by using FIG. 6B.

Among the POS terminals 30, a cash register being not used as a self-checkout during the unattended mode may be turned off at a time of shifting to the unattended mode, and a salesclerk may put a protection cover over the POS terminal 30 as a measure against crime prevention. Furthermore, locking is preferable. As described above, turning off of the POS terminal 30 may be performed automatically by the control unit 120 or operated manually by a salesclerk.

A cooking utensil such as the fryer 50 may cause a fire in a case of absence of a salesclerk, and is thus turned off and prohibited from use in the unattended mode. The fryer 50 is manually turned off by a salesclerk at a time of shifting to the unattended mode. The fryer 50 that can be controlled by the store management apparatus 100 may be instructed by the control unit 120 to be automatically turned off.

For the display shelf 60 on which a product with a limited sellable time such as alcoholic beverages described above is displayed among display shelves, a measure is taken in such a way that the product is not purchased by a customer during time other than the sellable time. As an example of the measure, a partition is installed for indicating a customer that the product is not available for sale. For example, a partition 62 that closes a front surface of the display shelf 60 is provided in such a way that a customer can be notified of a time period unavailable for purchase. The partition 62 may be a screen, a shutter, a door, a curtain, a blind, or the like, and its form is not particularly limited. At least a customer may be prevented from reaching for a product in the display shelf 60 by mistake. Installation of the partition 62 may be manual installation by a salesclerk at a time of switching of the unattended mode, or may be a configuration for automatically closing a shutter or the like by the control unit 120.

A mode switching unit 104 sets indication that a partition is installed as a necessary condition for switching to the unattended mode. In a case of a configuration in which a partition can be automatically opened and closed by a shutter or the like by the control unit 120, whether the partition is installed can be determined by acquiring information indicating an opening/closing state of the shutter from the control unit 120.

For a partition manually installed by a salesclerk such as a screen, the display shelf 60 being a target may be captured by the camera 20, a character or a marker described on the partition may be recognized, and a determination unit 102 may determine that the partition is installed when the character or the marker described on the partition is recognized.

Further, the store management apparatus 100 may further include a provision unit (not illustrated) that provides a work item at a time of mode switching. For example, with an item that can be worked only manually in FIG. 6B as an item that needs to be worked at a time of mode switching, a work check screen (not illustrated) may be displayed on a portable terminal (not illustrated) of a salesclerk or a display of a store PC (not illustrated) or the like. Furthermore, a check input section for a worked item may be provided. A salesclerk can place a check for each item having work completed, and an item having work completed and an item not having work completed can be recognized. The determination unit 102 may determine completion of manual work for whether installation of a partition is completed by acquiring information indicating whether the check is placed on the work check screen.

Furthermore, the determination unit 102 may determine whether a predetermined apparatus of the store 10 is in a non-operating state. The non-operating state includes power off, an operation stop, and a pause. For example, the determination unit 102 determines whether an attended cash register is in an unavailable state, whether power of the fryer 50 is off, and the like. The mode switching unit 104 sets a non-operating state of a predetermined apparatus as a necessary condition for switching to the unattended mode.

Figure 7:
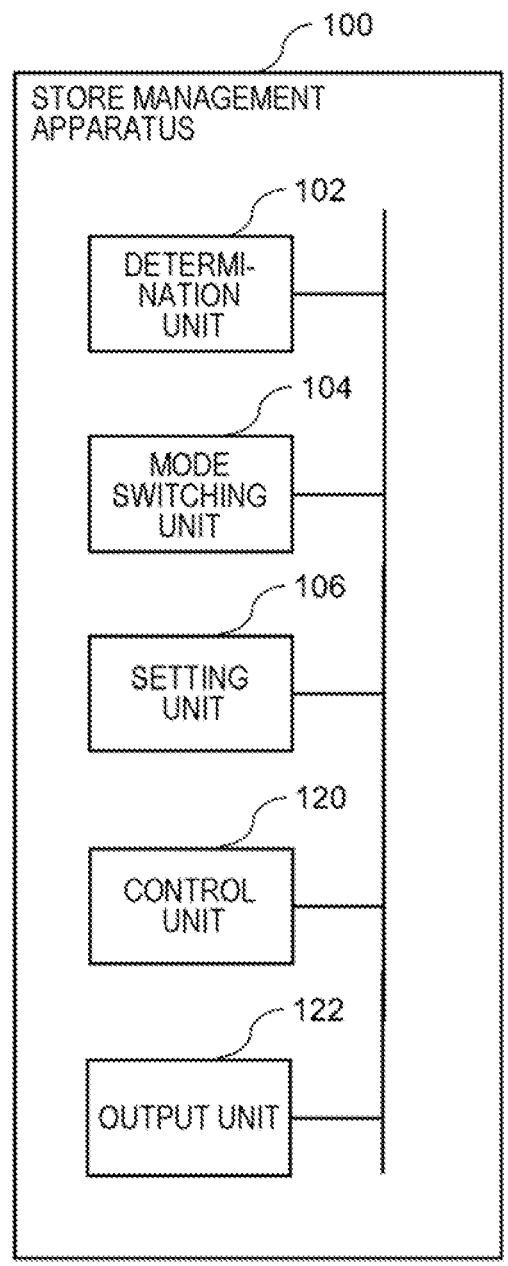
FIG. 7 is a functional block diagram illustrating another logical configuration example of the store management apparatus according to the present example embodiment.

As illustrated in FIG. 7, the store management apparatus 100 according to the present example embodiment may further include the output unit 122. The output unit 122 outputs an alert related to a fact that does not satisfy the necessary condition.

In addition to installation of a partition and a non-operating state of each apparatus and each facility described above, a state in which each apparatus and each facility need to be during each mode illustrated in FIG. 6 FIGS. 6A and 6B may be set as the necessary condition.

Specifically, the output unit 122 informs that a partition is not installed, power of the fryer 50 is not turned off, power of an attended cash register is not turned off, a protection cover for crime prevention is not put over an attended cash register, and the like at a time of switching to the unattended mode.

Alternatively, the output unit 122 outputs an alert when it is not in a state that needs to be automatically switched to at a time of switching to the unattended mode is detected. Specifically, a fact that the entry/exit management terminal 90 is not operated, a product master of the POS terminal 30 is not switched to a night product master excluding alcoholic beverages and the like, a surveillance level of the camera 20 is not increased, and the like is detected and informed.

Furthermore, the output unit 122 may output an alert for an item in which a check is not input on the work check screen described above.

An output destination of an alert of the output unit 122 is, for example, a terminal (not illustrated) of the store 10, a portable terminal (not illustrated) of a salesclerk, a management server 200 at a management center, and the like. As an output method of an alert, for example, display on a screen, transmission of a message, output of an informing sound or a sound, and the like are conceivable.

Furthermore, the mode switching unit 104 switches an operation mode of the store 10 to the unattended mode at a second reference time after the reference time with all necessary conditions being satisfied as a condition.

For example, the control unit 120 starts control of each apparatus and each facility at 10 pm being the reference time at which the attended mode is switched to the unattended mode. Work for changing setting during the unattended mode of each apparatus and each facility each takes time. Thus, the second reference time after the reference time is 10 minutes after the reference time, 30 minutes after the reference time, and the like, such as 10:10 μm and 10:30 pm, for example.

Figure 8:
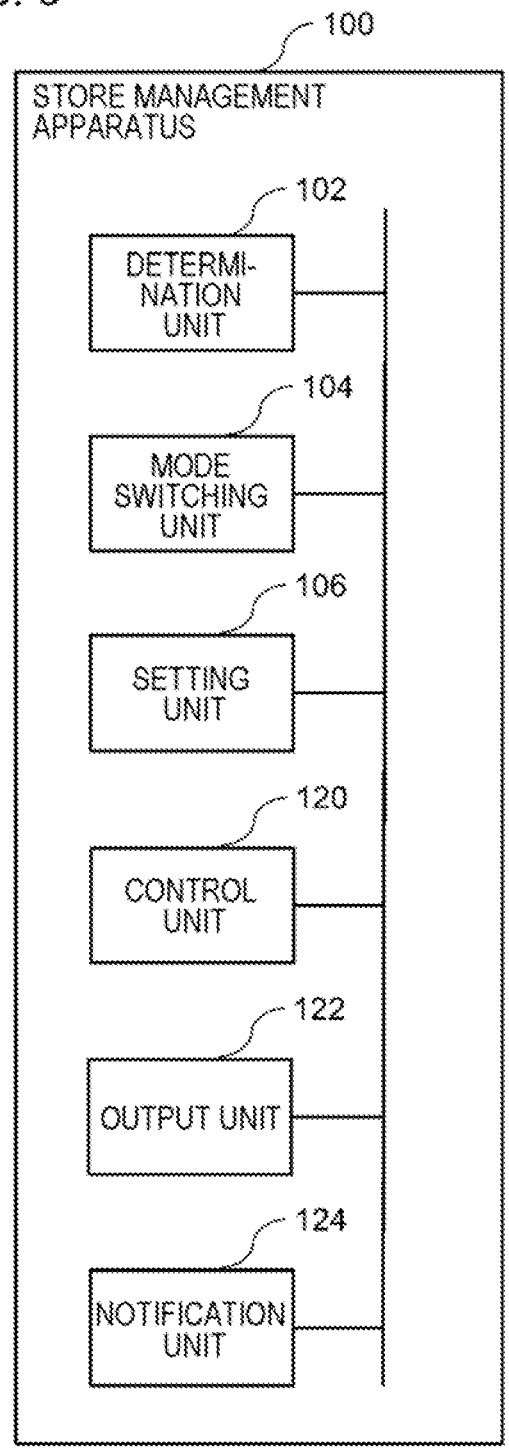
FIG. 8 is a functional block diagram illustrating a different logical configuration example of the store management apparatus according to the present example embodiment.

As illustrated in FIG. 8, the store management apparatus 100 according to the present example embodiment may further include the notification unit 124. The notification unit 124 notifies that an operation mode is switched.

Various methods for deciding that an operation mode is switched are conceivable. For example, it is at least either a case where all of the necessary conditions described above are satisfied or a case where switching of a mode is performed by the mode switching unit 104.

A notification destination by the notification unit 124 is, for example, a terminal (not illustrated) of the store 10, a portable terminal (not illustrated) of a salesclerk, or the management server 200. As a notification method, for example, display on a screen, transmission of a message, output of a notification sound or a sound, and the like are conceivable.

According to the present example embodiment, since the control unit 120 can change each apparatus and each facility to setting associated with a mode after shifting at a time of mode switching, an effect similar to that in the example embodiment described above can be achieved, and, furthermore, a load of work on a salesclerk at a time of shifting can be reduced.

Furthermore, since the output unit 122 can inform that a necessary condition at a time of mode switching is not satisfied, setting work needed for the mode switching can be reliably performed, and an inconvenience occurring due to a setting work mistake and the like can be avoided. Further, since the notification unit 124 can notify a management center and a salesclerk about completion of the mode switching, an administrator and a salesclerk can take action to find out a cause when the administrator and the salesclerk do not receive a completion notification about the mode switching.

Third Example Embodiment

Figure 9:
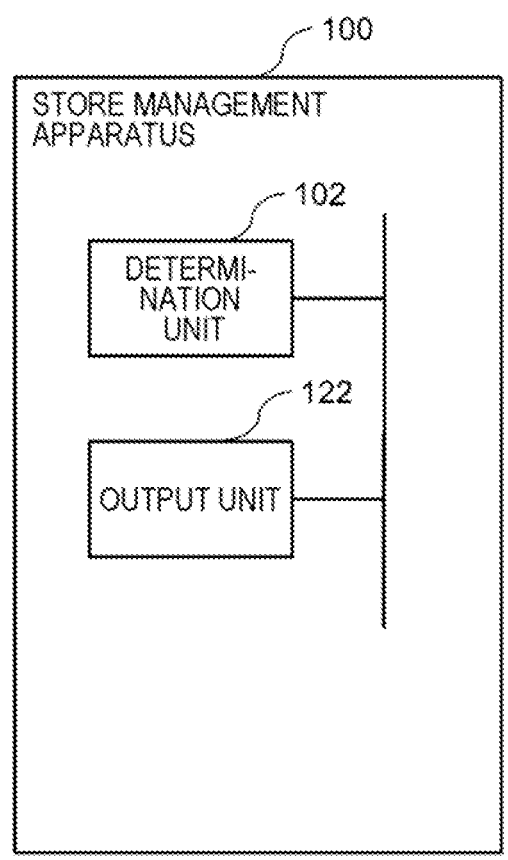
FIG. 9 is a functional block diagram illustrating a still different logical configuration example of the store management apparatus according to the present example embodiment.

FIG. 9 is a functional block diagram illustrating a logical configuration example of a store management apparatus 100 according to the present example embodiment. The store management apparatus 100 in FIG. 9 includes the determination unit 102 of the store management apparatus 100 in FIG. 2 and the output unit 122 of the store management apparatus 100 in FIG. 7. As illustrated in FIG. 9, the store management apparatus 100 may not necessarily include the other component included in the store management apparatus 100 according to any of the example embodiments described above, for example, the mode switching unit 104, the setting unit 106, the control unit 120, and the notification unit 124.

In the present example embodiment, for example, the determination unit 102 determines whether a predetermined partition is installed for a predetermined sales area at a reference time in a store 10. Then, the output unit 122 outputs an alert when it is determined that the predetermined partition is not installed.

An alert output destination and an output method of the output unit 122 may be similar to those of the output unit 122 in the second example embodiment described above. Further, a determination reference by the determination unit 102 may include at least one of the predetermined references described in the example embodiments described above. A condition and a reference to be used for a determination may be able to be set by an operation input of a salesclerk and an administrator for each store 10.

According to the present example embodiment, since the determination unit 102 has a configuration for determining whether a predetermined partition is installed at a reference time for a sales area such as a display shelf 60 of alcoholic beverages and the like that are prohibited from sale at night, and informing when the partition is not installed, alcoholic beverages can be prevented from sale due to the partition not being installed after the reference time.

Each of the example embodiments and the modification aspects described above can be combined within a consistent range. For example, the store management apparatus 100 in FIG. 2 can be combined with at least one of the control unit 120 in FIG. 5, the output unit 122 in FIG. 7, and the notification unit 124 in FIG. 8.

While the example embodiments of the present invention have been described with reference to the drawings, the example embodiments are only exemplification of the present invention, and various configurations other than the above-described example embodiments can also be employed.

For example, in the example embodiments described above, the form in which a door installed at the entrance of the store 10 is the automatic door 70 that can be automatically opened and closed is described. In another form, a door installed at the entrance of the store 10 may be a door whose electric lock can be remotely controlled, for example, double doors. In a case of double doors, opening and closing of the doors are manually performed, and thus a human detection sensor may not be installed around the doors. In other words, a store-entry condition (detection of presence of a person by the human detection sensor 80) when an operation mode is the attended mode may not be set.

Further, during the unattended mode, the control unit 120 performs control of locking and unlocking on the electronic lock provided on the doors instead of the opening/closing control of the door of the automatic door 70. When a customer enters the store 10 during the unattended mode, the control unit 120 unlocks the electronic lock by authenticating or capturing the customer by the entry/exit management terminal 90 (by satisfying a store-entry condition). When the electronic lock is unlocked, the customer can enter the store by manually opening the doors. The control unit 120 locks the electronic lock after a person enters the store (for example, after a lapse of a predetermined time).

Further, in a case of a store exit from the store 10, the control unit 120 unlocks the electronic lock when the control unit 120 receives a press on an unlocking operation button provided inside the store 10. When the electronic lock is unlocked, a customer can exit the store by manually opening the doors. The control unit 120 locks the electronic lock after a person exits the store (for example, after a lapse of a predetermined time).

The invention of the present application is described above with reference to the example embodiments and the examples, but the invention of the present application is not limited to the example embodiments and the examples described above. Various modifications that can be understood by those skilled in the art can be made to the configuration and the details of the invention of the present application within the scope of the invention of the present application.

Note that, when information about a user such as a customer is acquired and used in the present invention, this is lawfully performed.

A part or the whole of the above-described example embodiment may also be described in supplementary notes below, which is not limited thereto.

1. A store management apparatus, including:
   a determination unit that determines whether a predetermined reference is satisfied in a store;
   a mode switching unit that switches, by using a determination result by the determination unit, an operation mode of the store between an attended mode in which at least a salesclerk is permanently stationed and an unattended mode in which the salesclerk is not permanently stationed; and
   a setting unit that switches a store-entry condition to the store according to the operation mode after switching when the mode switching unit switches the operation mode, wherein
   the predetermined reference is absence of a customer near an entrance of the store at a reference time.

2. The store management apparatus according to 1, further including
   a control unit that controls an apparatus in the store according to the operation mode.

3. The store management apparatus according to note 1 or 2, wherein
   the setting unit
      sets, as the store-entry condition when the operation mode is the attended mode, detection of a person by a human detection sensor in conjunction with opening/closing control of a door at an entrance of the store, and
      sets, as the store-entry condition when the operation mode is the unattended mode, reception of an input, by a customer, of a store-entry operation being performed on a terminal installed near a door at an entrance of the store.

4. The store management apparatus according to 3 citing 2, wherein
   the control unit stops opening/closing control of a door in conjunction with a human detection sensor when the operation mode is the unattended mode, and performs opening/closing control of the door, based on an authentication result using an input, by a customer, of a store-entry operation being performed on a terminal installed near the door at an entrance of the store.

5. The store management apparatus according to 4, wherein
   the control unit causes a camera to capture a face of the customer who enters the store in a case where the operation mode is the unattended mode.

6. The store management apparatus according to 4 or 5, wherein
   the control unit causes a camera to capture a face of the customer when an input, by the customer, of the store-entry operation is not received in a case where the operation mode is the unattended mode.

7. The store management apparatus according to any one of 1 to 6, wherein
   the setting unit further sets, according to the operation mode, an exit condition for opening a door at the entrance when the customer exits the store.

8. The store management apparatus according to any one of 1 to 7, wherein
   the mode switching unit further sets, as a necessary condition for mode switching, reception of an input of a mode switching instruction from the salesclerk.

9. The store management apparatus according to any one of 1 to 8, wherein
   the mode switching unit sets, as a necessary condition for mode switching, reception of an input of a mode switching instruction from a management center that remotely manages the store.

10. The store management apparatus according to any one of 3 to 9 citing 2, wherein
    the control unit switches an operating mode of a POS terminal at a time of switching from the attended mode to the unattended mode.

11. The store management apparatus according to any one of 1 to 10, wherein
    the predetermined reference is a fact that a predetermined partition indicating unavailability for sale is installed for a predetermined sales area, and
    the mode switching unit sets installation of the partition as a necessary condition for switching to the unattended mode.

12. The store management apparatus according to any one of 1 to 11, wherein
    the predetermined reference is a non-operating state for a predetermined apparatus of the store, and
    the mode switching unit sets the non-operating state of the predetermined apparatus as a necessary condition for switching to the unattended mode.

13. The store management apparatus according to any one of 9 to 12 citing 8, further including
    an output unit that outputs an alert related to a fact that does not satisfy the necessary condition.

14. The store management apparatus according to any one of 9 to 13 citing 8, wherein
    the mode switching unit switches the operation mode of the store to the unattended mode at a second reference time after the reference time with all of the necessary conditions being satisfied as a condition.

15. The store management apparatus according to any one of 1 to 14, further including
    a notification unit that notifies that the operation mode is switched.

16. A store management method, including,
    by a store management apparatus:
    determining whether a predetermined reference is satisfied in a store;
    switching, by using a determination result, an operation mode of the store between an attended mode in which at least a salesclerk is permanently stationed and an unattended mode in which the salesclerk is not permanently stationed; and
    switching a store-entry condition to the store according to the operation mode after switching when the operation mode is switched, wherein
    the predetermined reference is absence of a customer near an entrance of the store at a reference time.

17. The store management method according to 16, further including,
    by the store management apparatus,
    controlling an apparatus in the store according to the operation mode.

18. The store management method according to 16 or 17, further including,
by the store management apparatus:
setting, as the store-entry condition when the operation mode is the attended mode, detection of a person by a human detection sensor in conjunction with opening/closing control of a door at an entrance of the store; and
setting, as the store-entry condition when the operation mode is the unattended mode, reception of an input, by a customer, of a store-entry operation being performed on a terminal installed near a door at an entrance of the store.

19. The store management method according to 18 citing 17, further including,
by the store management apparatus,
stopping opening/closing control of a door in conjunction with a human detection sensor when the operation mode is the unattended mode, and performing opening/closing control of the door, based on an authentication result using an input, by a customer, of a store-entry operation being performed on a terminal installed near the door at an entrance of the store.

20. The store management method according to 19, further including,
by the store management apparatus,
causing a camera to capture a face of the customer who enters the store in a case where the operation mode is the unattended mode.

21. The store management method according to 19 or 20, further including,
by the store management apparatus,
causing a camera to capture a face of the customer when an input of the store-entry operation of the customer is not received in a case where the operation mode is the unattended mode.

22. The store management method according to any one of 16 to 21, further including,
by the store management apparatus,
further setting, according to the operation mode, an exit condition for opening a door at the entrance when the customer exits the store.

23. The store management method according to any one of 16 to 22, further including,
by the store management apparatus,
further setting, as a necessary condition for mode switching, reception of an input of a mode switching instruction from the salesclerk.

24. The store management method according to any one of 16 to 23, further including,
by the store management apparatus,
setting, as a necessary condition for mode switching, reception of an input of a mode switching instruction from a management center that remotely manages the store.

25. The store management method according to any one of 18 to 24 citing 17, further including,
by the store management apparatus,
switching an operating mode of a POS terminal at a time of switching from the attended mode to the unattended mode.

26. The store management method according to any one of 16 to 25, wherein
the predetermined reference is a fact that a predetermined partition indicating unavailability for sale is installed for a predetermined sales area,
the store management method further including, by the store management apparatus, setting installation of the partition as a necessary condition for switching to the unattended mode.

27. The store management method according to any one of 16 to 26, wherein
the predetermined reference is a non-operating state for a predetermined apparatus of the store,
the store management method further including, by the store management apparatus, setting the non-operating state of the predetermined apparatus as a necessary condition for switching to the unattended mode.

28. The store management method according to any one of 24 to 27 citing 23, further including,
by the store management apparatus,
outputting an alert related to a fact that does not satisfy the necessary condition.

29. The store management method according to any one of 24 to 28 citing 23, further including,
by the store management apparatus,
switching the operation mode of the store to the unattended mode at a second reference time after the reference time with all of the necessary conditions being satisfied as a condition.

30. The store management method according to any one of 16 to 29, further including,
by the store management apparatus,
notifying that the operation mode is switched.

31. A program for causing a computer to execute:
a procedure of determining whether a predetermined reference is satisfied in a store;
a procedure of switching, by using a determination result in the procedure of determining, an operation mode of the store between an attended mode in which at least a salesclerk is permanently stationed and an unattended mode in which the salesclerk is not permanently stationed; and
a procedure of switching a store-entry condition to the store according to the operation mode after switching when the operation mode is switched in the procedure of switching the operation mode, wherein
the predetermined reference is absence of a customer near an entrance of the store at a reference time.

32. The program according to 31 for causing a computer to execute
a procedure of controlling an apparatus in the store according to the operation mode.

33. The program according to 31 or 32 for causing a computer to execute,
in the procedure of switching the store-entry condition:
a procedure of setting, as the store-entry condition when the operation mode is the attended mode, detection of a person by a human detection sensor in conjunction with opening/closing control of a door at an entrance of the store; and
a procedure of setting, as the store-entry condition when the operation mode is the unattended mode, reception of an input, by a customer, of a store-entry operation being performed on a terminal installed near a door at an entrance of the store.

34. The program according to 33 citing 32 for causing a computer to execute
a procedure of stopping opening/closing control of a door in conjunction with a human detection sensor when the operation mode is the unattended mode, and performing opening/closing control of the door, based on an authentication result using an input, by a customer, of a store-entry operation being performed on a terminal installed near the door at an entrance of the store.

35. The program according to 34 for causing a computer to execute
a procedure of causing a camera to capture a face of the customer who enters the store in a case where the operation mode is the unattended mode.

36. The program according to 34 or 35 for causing a computer to execute
a procedure of causing a camera to capture a face of the customer when an input, by a customer, of the store-entry operation is not received in a case where the operation mode is the unattended mode.

37. The program according to any one of 31 to 36 for causing a computer to execute,
in the procedure of switching the store-entry condition,
a procedure of further setting, according to the operation mode, an exit condition for opening a door at the entrance when the customer exits the store.

38. The program according to any one of 31 to 37 for causing a computer to execute,
in the procedure of switching the operation mode,
a procedure of further setting, as a necessary condition for mode switching, reception of an input of a mode switching instruction from the salesclerk.

39. The program according to any one of 31 to 38 for causing a computer to execute,
in the procedure of switching the operation mode,
a procedure of setting, as a necessary condition for mode switching, reception of an input of a mode switching instruction from a management center that remotely manages the store.

40. The program according to any one of 33 to 39 citing 32 for causing a computer to execute
a procedure of switching an operating mode of a POS terminal at a time of switching from the attended mode to the unattended mode.

41. The program according to any one of 31 to 40, wherein
the predetermined reference is a fact that a predetermined partition indicating unavailability for sale is installed for a predetermined sales area,
the program causing a computer to execute, in the procedure of switching the operation mode, a procedure of setting installation of the partition as a necessary condition for switching to the unattended mode.

42. The program according to any one of 31 to 41, wherein
the predetermined reference is a non-operating state for a predetermined apparatus of the store,
the program causing a computer to execute, in the procedure of switching the operation mode, a procedure of setting the non-operating state of the predetermined apparatus as a necessary condition for switching to the unattended mode.

43. The program according to any one of 39 to 42 citing 38 causing a computer to execute
a procedure of outputting an alert related to a fact that does not satisfy the necessary condition.

44. The program according to any one of 39 to 43 citing 38 for causing a computer to execute,
in the procedure of switching the operation mode,
a procedure of switching the operation mode of the store to the unattended mode at a second reference time after the reference time with all of the necessary conditions being satisfied as a condition.

45. The program according to any one of 31 to 44 for further causing a computer to execute
a procedure of notifying that the operation mode is switched.

46. A store management apparatus, including:
a determination unit that determines whether a predetermined partition is installed for a predetermined sales area at a reference time in a store; and
an output unit that outputs an alert when it is determined that the predetermined partition is not installed.

47. A store management method, including,
by a store management apparatus:
determining whether a predetermined partition is installed for a predetermined sales area at a reference time in a store; and
outputting an alert when it is determined that the predetermined partition is not installed.

48. A program for causing a computer to execute:
a procedure of determining whether a predetermined partition is installed for a predetermined sales area at a reference time in a store; and
a procedure of outputting an alert when it is determined that the predetermined partition is not installed.

REFERENCE SIGNS LIST

1 Store system
3 Communication network
10 Store
20 Camera
30 POS terminal
40 Display
42 Speaker
50 Fryer
60 Display shelf
62 Partition
70 Automatic door
72 Touch center
80 Human detection sensor
90 Entry/exit management terminal
100 Store management apparatus
102 Determination unit
104 Mode switching unit
106 Setting unit
120 Control unit
122 Output unit
124 Notification unit
200 Management server
210 Image recognition apparatus
220 Authentication apparatus
1000 Computer
1010 Bus
1020 Processor
1030 Memory
1040 Storage device
1050 Input/output interface
1060 Network interface

What is claimed is:

1. A store management apparatus, comprising:
at least one memory configured to store instructions; and
at least one processor configured to execute the instructions to:
determine whether a predetermined reference is satisfied in a store;
switch, by using a determination result, an operation mode of the store between an attended mode in which at least a salesclerk is permanently stationed and an unattended mode in which the salesclerk is not permanently stationed; and switch a store-entry condition to the store according to the operation mode after switching when switching the operation mode, wherein the store-entry condition includes a first store-entry condition for entering the store in the attended mode and a second store-entry condition for entering the store in the unattended mode, the first store-entry condition and the second store-entry condition are different from each other, and the predetermined reference is absence of a customer near an entrance of the store at a reference time.

2. The store management apparatus according to claim 1, wherein the at least one processor is further configured to execute the instructions to control an apparatus in the store according to the operation mode.

3. The store management apparatus according to claim 2, wherein the at least one processor is further configured to execute the instructions to set, as the store-entry condition when the operation mode is the attended mode, detection of a person by a human detection sensor in conjunction with opening/closing control of a door at the entrance of the store, and set, as the store-entry condition when the operation mode is the unattended mode, reception of an input, by the customer, of a store-entry operation being performed on a terminal installed near the door at the entrance of the store.

4. The store management apparatus according to claim 3, wherein the at least one processor is further configured to execute the instructions to stop the opening/closing control of the door in conjunction with the human detection sensor when the operation mode is the unattended mode, and perform the opening/closing control of the door, based on an authentication result using the input, by the customer, of the store-entry operation being performed on the terminal installed near the door at the entrance of the store.

5. The store management apparatus according to claim 4, wherein the at least one processor is further configured to execute the instructions to cause a camera to capture a face of the customer who enters the store in a case where the operation mode is the unattended mode.

6. The store management apparatus according to claim 4, wherein the at least one processor is further configured to execute the instructions to cause a camera to capture a face of the customer when the input, by the customer, of the store-entry operation is not received in a case where the operation mode is the unattended mode.

7. The store management apparatus according to claim 3, wherein the at least one processor is further configured to execute the instructions to switch an operating mode of a POS (Point Of Sales) terminal at a time of switching from the attended mode to the unattended mode.

8. The store management apparatus according to claim 1, wherein the at least one processor is further configured to execute the instructions to further set, according to the operation mode, an exit condition for opening a door at the entrance when the customer exits the store.

9. The store management apparatus according to claim 1, wherein the at least one processor is further configured to execute the instructions to further set, as a necessary condition for mode switching, reception of an input of a mode switching instruction from the salesclerk.

10. The store management apparatus according to claim 9, wherein the at least one processor is further configured to execute the instructions to set, as the necessary condition for mode switching, reception of the input of the mode switching instruction from a management center that remotely manages the store.

11. The store management apparatus according to claim 10, wherein the at least one processor is further configured to execute the instructions to output an alert related to a fact that does not satisfy the necessary condition.

12. The store management apparatus according to claim 10, wherein the at least one processor is further configured to execute the instructions to switch the operation mode of the store to the unattended mode at a second reference time after the reference time based on a plurality of necessary conditions being satisfied.

13. The store management apparatus according to claim 1, wherein the predetermined reference is a fact that a predetermined partition indicating unavailability for sale is installed for a predetermined sales area, and the at least one processor is further configured to execute the instructions to set installation of the predetermined partition as a necessary condition for switching to the unattended mode.

14. The store management apparatus according to claim 1, wherein the predetermined reference is a non-operating state for a predetermined apparatus of the store, and the at least one processor is further configured to execute the instructions to set that the predetermined apparatus is in the non-operating state as a necessary condition for switching to the unattended mode.

15. The store management apparatus according to claim 1, wherein the at least one processor is further configured to execute the instructions to notify that the operation mode is switched.

16. A store management method, comprising, by a store management apparatus:

determining whether a predetermined reference is satisfied in a store;

switching, by using a determination result, an operation mode of the store between an attended mode in which at least a salesclerk is permanently stationed and an unattended mode in which the salesclerk is not permanently stationed; and switching a store-entry condition to the store according to the operation mode after switching when the operation mode is switched, wherein the store-entry condition includes a first store-entry condition for entering the store in the attended mode and a second store-entry condition for entering the store in the unattended mode, the first store-entry condition and the second store-entry condition are different from each other, and the predetermined reference is absence of a customer near an entrance of the store at a reference time.

17. A non-transitory computer-readable storage medium storing a program for causing a computer to execute:

a procedure of determining whether a predetermined reference is satisfied in a store;

a procedure of switching, by using a determination result in the procedure of determining, an operation mode of the store between an attended mode in which at least a salesclerk is permanently stationed and an unattended mode in which the salesclerk is not permanently stationed; and a procedure of switching a store-entry condition to the store according to the operation mode after switching when the operation mode is switched in the procedure of switching the operation mode, wherein the store-entry condition includes a first store-entry condition for entering the store in the attended mode and a second store-entry condition for entering the store in the unattended mode, the first store-entry condition and the second store-entry condition are different from each other, and the predetermined reference is absence of a customer near an entrance of the store at a reference time.

* * * * *